US007609511B2

(12) United States Patent
Peng et al.

(10) Patent No.: US 7,609,511 B2
(45) Date of Patent: Oct. 27, 2009

(54) FIXING APPARATUS FOR HARD DISK DRIVE

(75) Inventors: Wen-Tang Peng, Taipei Hsien (TW); Mo-Ming Yu, Shenzhen (CN); Wei-Chao Huang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 42 days.

(21) Appl. No.: 11/963,869

(22) Filed: Dec. 24, 2007

(65) Prior Publication Data

US 2009/0059508 A1 Mar. 5, 2009

(30) Foreign Application Priority Data

Aug. 30, 2007 (CN) .......................... 2007 1 0201526

(51) Int. Cl.
*G06F 1/16* (2006.01)
(52) U.S. Cl. ............... 361/679.37; 248/633; 364/708.1; 439/638; 360/244.3
(58) Field of Classification Search ............ 361/679.26, 361/679.27, 679.3, 679.33, 679.35, 679.37; 248/618, 633; 364/708.1; 437/638; 360/244.3
See application file for complete search history.

(56) References Cited

U.S. PATENT DOCUMENTS

| 5,654,873 | A | * | 8/1997 | Smithson et al. | ........ 361/679.37 |
| 2007/0211422 | A1 | * | 9/2007 | Liu et al. | ..................... 361/685 |
| 2008/0278856 | A1 | * | 11/2008 | Peng et al. | ............... 360/244.3 |

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive (HDD) having a plurality of holes defined in sidewalls thereof. The fixing apparatus includes a first bracket, a second bracket, and a bezel assembly. The first bracket includes a side plate, an end plate perpendicularly extending from one end of the side plate, and a pivoting portion formed at the other end of the side plate. The second bracket includes a side plate, an end plate perpendicularly extending from one end of the side plate to pivotably engage with the end plate of the first bracket, and an extension portion formed at the other end of the side plate. The bezel assembly is pivotably attached to the pivoting portion of the first bracket and detachably locked with the extension portion of the second bracket. The side plates include a plurality of fixing members to engage in the holes of the disk drive, respectively.

6 Claims, 4 Drawing Sheets

FIXING APPARATUS FOR HARD DISK DRIVE

CROSS-REFERENCES TO RELATED APPLICATION

Relevant subject matter is disclosed in the 6 co-pending U.S. patent applications; filed on the same date and having a same title as the present application, which are assigned to the same assignee as this patent application. Relevant subject matter is also disclosed in the co-pending U.S. patent application Ser. No. 11/953,863, filed on Dec. 11, 2007, having a same title as the present application, which is assigned to the same assignee as this patent application.

BACKGROUND

1. Field of the Invention

The present invention relates to fixing apparatuses, and particularly to a fixing apparatus for hard disk drives (HDDs).

2. Description of Related Art

The conventional approach now being adopted to mount an HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installing and removing operations of the HDD tedious.

What is desired, therefore, is a fixing apparatus which allows convenient installation and removal of an HDD.

SUMMARY

An exemplary fixing apparatus is for mounting a hard disk drive (HDD) having a plurality of holes defined in sidewalls thereof. The fixing apparatus includes a first bracket, a second bracket, and a bezel assembly. The first bracket includes a side plate, an end plate perpendicularly extending from one end of the side plate, and a pivoting portion formed at the other end of the side plate. The second bracket includes a side plate, an end plate perpendicularly extending from one end of the side plate to pivotably engage with the end plate of the first bracket, and an extension portion formed at the other end of the side plate. The bezel assembly is pivotably attached to the pivoting portion of the first bracket and detachably locked with the extension portion of the second bracket. The side plates include a plurality of fixing members to engage in the holes of the disk drive, respectively.

Other advantages and novel features will become more apparent from the following detailed description when taken in conjunction with the accompanying drawings, in which:

DETAILED DESCRIPTION OF THE EMBODIMENT

Figure 1:
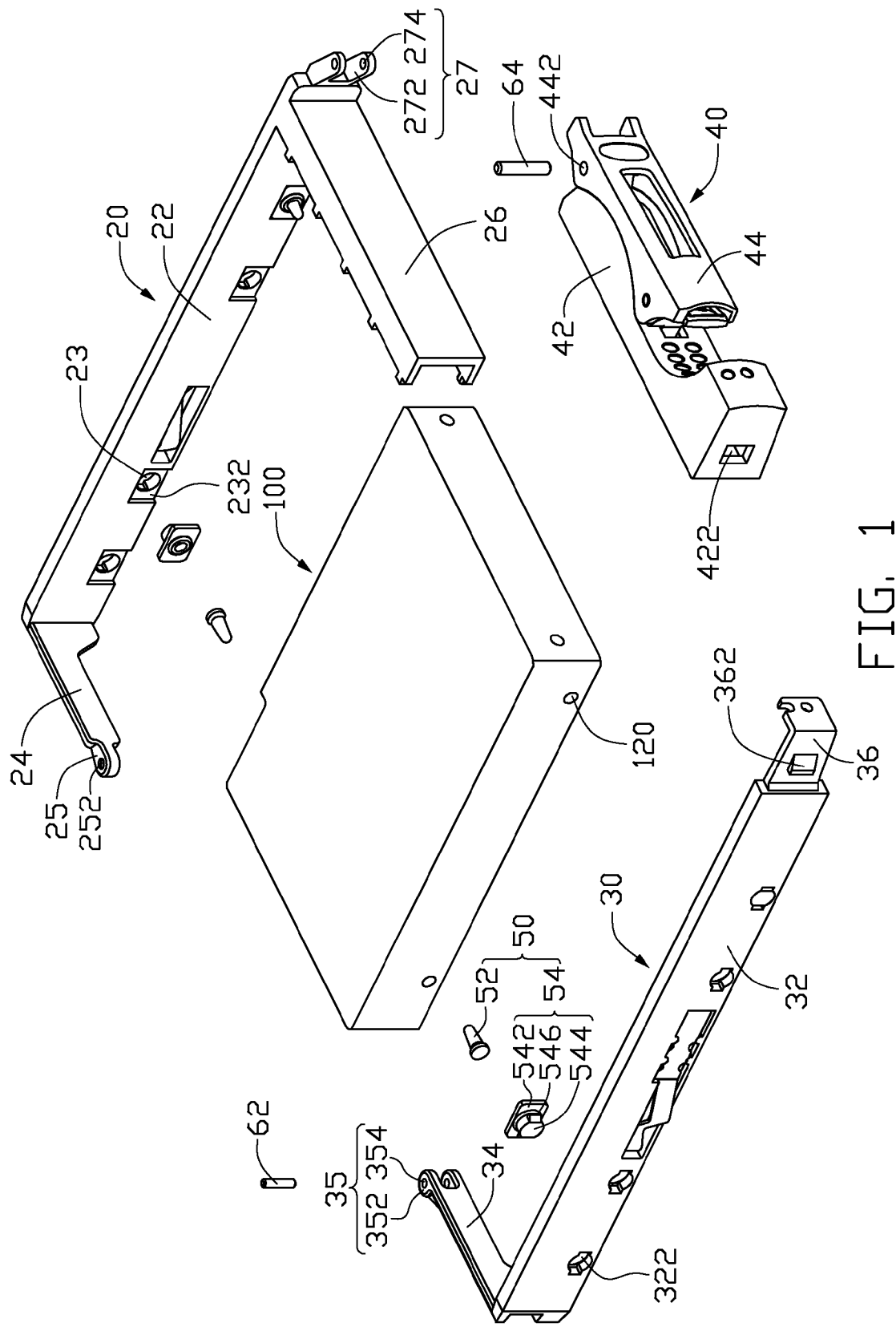
FIGS. 1 and 2 are exploded, isometric views of a fixing apparatus of an embodiment of the present invention together with an HDD, but viewed in different aspects.

Referring to FIG. 1, a fixing apparatus in accordance with an embodiment of the present invention is for fixing a hard disk drive (HDD) 100 and includes a first bracket 20, a second bracket 30, a bezel assembly 40, and two shafts 62, 64.

The HDD 100 includes a pair of holes 120 defined in each of two opposite sidewalls thereof.

Figure 2:
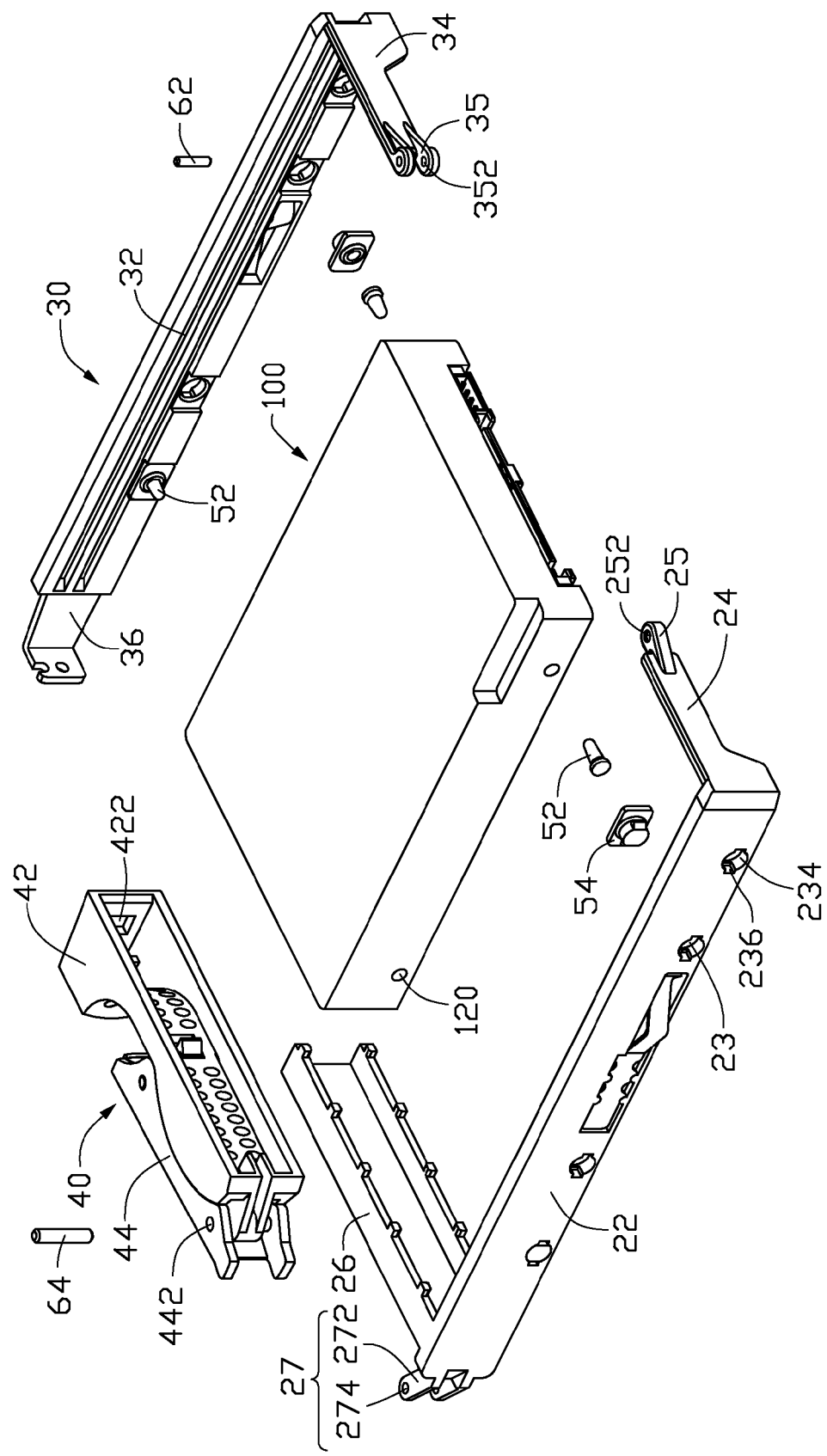

Referring also to FIG. 2, the first bracket 20 includes a side plate 22, an end plate 24, and a transverse member 26. The end plate 24 and the transverse member 26 are perpendicularly disposed at opposite ends of the side plate 22 respectively. The end plate 25 includes a pivoting portion 25 having a pivoting hole 252 and extending from a free end thereof. The side plate 22 includes a pivoting portion 27 slantingly extending from the end thereof adjacent the transverse member 26. The pivoting portion 27 includes a pair of spaced tabs 272 each having a pivoting hole 274. The side plate 22 includes a plurality of mounting holes 23 defined therein to retain a plurality of fixing members 50 therein. Each of the mounting holes 23 includes a rectangular recess 232, a cylindrical hole 234, and a pair of slots 236 oppositely extending from and communicating with the cylindrical hole 234.

The second bracket 30 includes a side plate 32, an end plate 34, and an extension portion 36. The end plate 34 extends perpendicularly from one end of the side plate 32. The end plate 34 includes pivoting portion 35 formed at a free end thereof. The pivoting portion 35 includes a pair of parallel spaced tabs 352 each having a pivoting hole 354. The extension portion 36 extends forward from the other end of the side plate 32. A wedged block 362 extends form an outside of the extension portion 36. The side plate 32 includes a plurality of mounting holes 322 defined therein to retain a plurality of fixing members 50. Each of the mounting holes 322 has a similar configuration as the mounting hole 23 of the first bracket 20.

The bezel assembly 40 includes a bezel 42, and a handle 44 pivotably engaging with the bezel 42. The handle 44 includes a pair of vertically aligned pivoting holes 442 respectively defined in an upper portion and a lower portion thereof. The bezel 42 includes a receiving space defined therein. A locking hole 422 is defined in an outside wall of the bezel 42 beside the receiving space to engage with the wedged block 362 of the extension portion 36 of the second bracket 30.

Each of the fixing members 50 includes a cap 54, and a pin 52 with one end embedded in the cap 54. The pin 52 is made of metal. The cap 54 is made of shock absorbing material, such as rubber. Each cap 54 includes a rectangular portion 542, a cylindrical portion 544 perpendicularly extending from the rectangular portion 542, and a pair of wedged protrusions 546 extending oppositely from a circumferential wall of the cylindrical portion 544.

The fixing members 50 are attached to the side plate 22 of the first bracket 20, with the rectangular portions 542 of the caps 54 engaging in the rectangular recesses 232 of the side plate 22, the cylindrical portions 544 of the caps 54 engaging in the cylindrical holes 234 of the side plate 22, and the wedged protrusions 546 engaging in the slots 236 of the side plate 22. The fixing members 50 are also attached to the side plate 32 of the second bracket 30 in a same way as to the first bracket 20.

Figure 3:
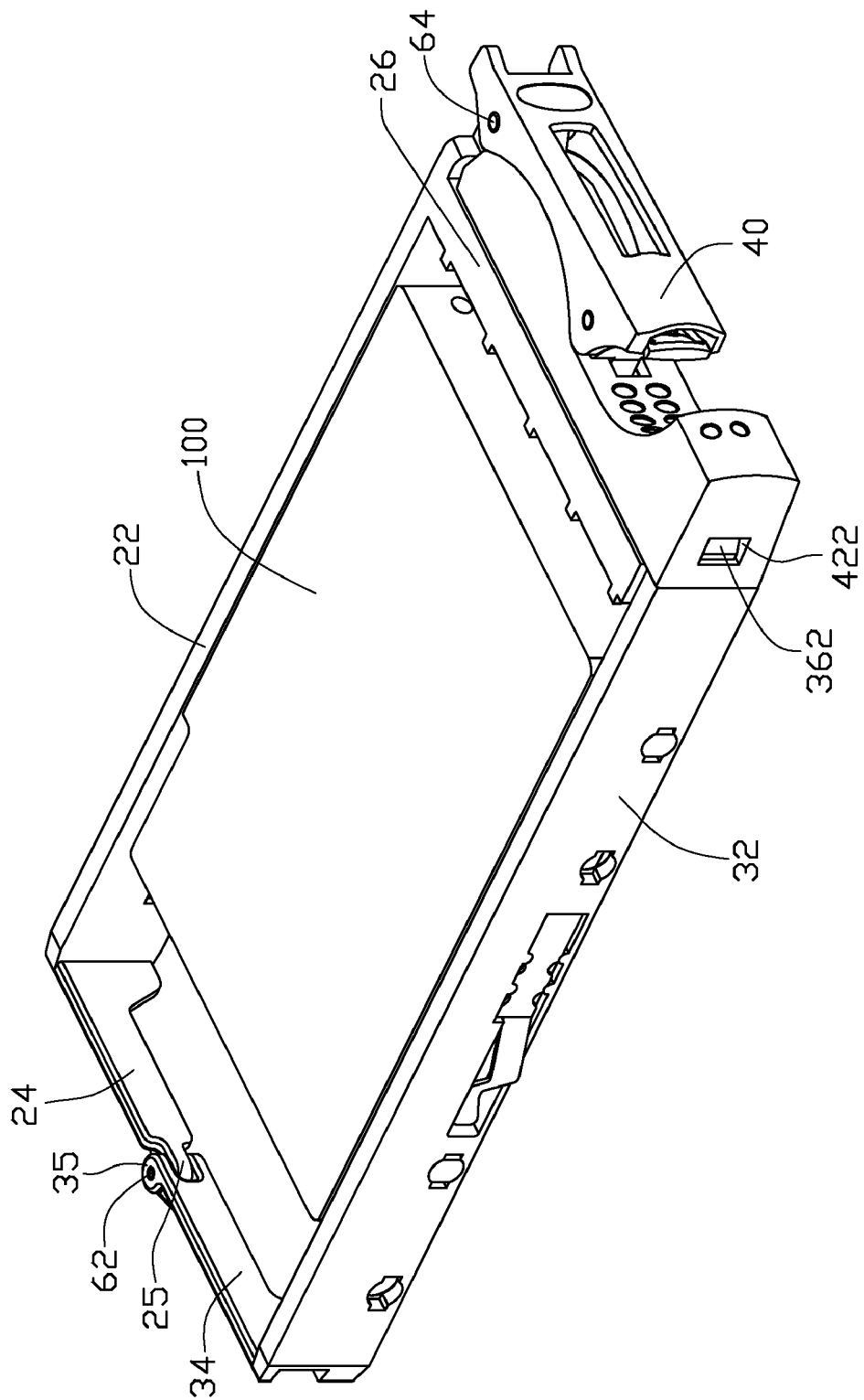
FIGS. 3 and 4 are assembled views of the fixing apparatus of FIG. 1, respectively showing the HDD in a locking position and a releasing position.
Figure 4:
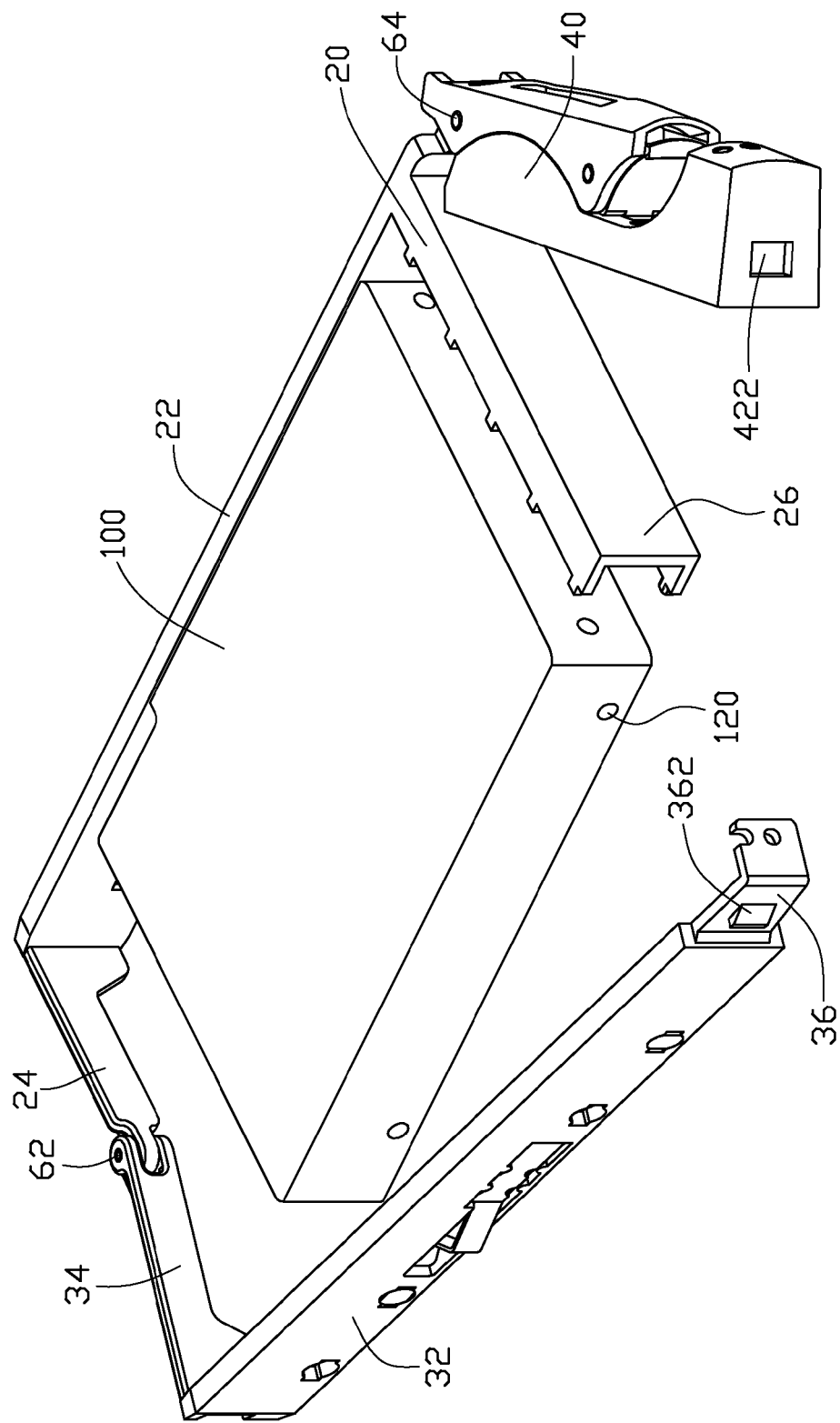

Referring also to FIGS. 3 and 4, in assembly, the first bracket 20 is pivotably attached to the second bracket 30, with the pivoting portion 25 of the first bracket 20 sandwiched between the tabs 352 of the pivoting portion 35 of the second bracket 30. The shaft 62 extends through the pivoting holes 354 of the second bracket 30 and the pivoting hole 252 of the first bracket 20. The bezel assembly 40 is pivotably attached to the second bracket 30, with the tabs 272 of the pivoting portion 27 of the first bracket 20 sandwiched between the upper and lower portions of the handle 44 of the bezel assembly 40. The shaft 64 extends through the pivoting holes 442 of the bezel assembly 40 and the pivoting holes 274 of pivoting portion 27 of the first bracket 20. The extension portion 36 of the second bracket 30 extends into the receiving space of the bezel 42 of the bezel assembly 40, with the wedged block 362 detachably engaging in the locking hole 422.

Referring also to FIG. 4, in use, the wedged block 362 of the second bracket 30 is pushed inward by a tip of a pen or a sharp article to disengage from the locking hole 422 of the bezel assembly 40. Thus, the bezel assembly 40 is pivoted about the shaft 64 to move away from the transverse member 26 of the first bracket 20 and the second bracket 30 is pivoted about the shaft 62 to move away from the side plate 22 of the first bracket 20 to allow the HDD 100 to be placed between the first bracket 20 and the second bracket 30. The pins 52 of the fixing members 50 of the second bracket 30 extend into the holes 120 of one sidewall of the HDD 10. Then, the first bracket 20 is pivoted back to the HDD 100 so that the pins 52 of the first bracket 20 extend into the holes 120 of the other sidewall of the HDD 100. Subsequently, the bezel assembly 40 is pivoted to the transverse member 26 of the first bracket 20 to allow the wedged block 362 of the second bracket 30 to be engaged in the locking hole 422 of the bezel assembly 40. Thus, the HDD 100 is secured.

To release the HDD 100, the wedged block 362 of the second bracket 30 is pushed inward to disengage from the locking hole 422 of the bezel assembly 40. Then, the bezel assembly 40 is pivoted about the shaft 64 to move away from the first bracket 20, and the second bracket 30 is pivoted about the shaft 62 to move away from the first bracket 20. Thus, the HDD 100 can be easily detached.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:

a first bracket comprising a side plate, an end plate perpendicularly extending from one end of the side plate, and a first pivoting portion slantingly extending from the other end of the side plate;

a second bracket comprising a side plate, and an end plate perpendicularly extending from one end of the side plate to pivotably engage with the end plate of the first bracket;

a bezel assembly pivotably attached to the pivoting portion of the first bracket and detachably locked with the side plate of the second bracket; and a plurality of fixing members attached to the side plates of the first and the second brackets to engage in the holes of HDD.

2. The fixing apparatus as claimed in claim 1, wherein the end plate of the second bracket comprises a pivoting portion having a pair of parallel spaced tabs formed at a free end thereof, the end plate of the first bracket comprises a second pivoting portion having a pivoting hole extending from a free end thereof, the second pivoting portion of the first bracket is sandwiched between the tabs of the second bracket, a shaft is extended through the pivoting holes of the second bracket and the first bracket to pivotably connect the first bracket with the second bracket.

3. The fixing apparatus as claimed in claim 1, wherein the side plate of the second bracket comprises an extension portion extending forward from the other end thereof, a wedged block is formed on the extension portion, the bezel assembly comprises a bezel, the bezel comprises a receiving space defined therein to receive the extension portion, a locking hole is define in the bezel beside the receiving space to engage with the wedged block.

4. The fixing apparatus as claimed in claim 1, wherein the bezel assembly comprises a handle having a pair of pivoting holes defined in two spaced portions thereof, the first pivoting portion of the first bracket comprises a pair of spaced tabs each having a pivoting hole, the tabs of the first pivoting portion are sandwiched between the spaced portions of the handle, a shaft is extended through the pivoting holes of the handle and the first pivoting portion of the first bracket to pivotably connect the bezel assembly to the first bracket.

5. The fixing apparatus as claimed in claim 1, wherein each of the fixing members comprises a cap, and a pin with one end embedded in the cap.

6. The fixing apparatus as claimed in claim 5, wherein the cap comprises a rectangular portion, a cylindrical portion perpendicularly extending from the rectangular portion, and a pair of wedged protrusions extending opposite to each other from the circumferential wall of the cylindrical portion, the side plates comprises a plurality of mounting holes defined therein to retain the fixing members.

* * * * *